Jan. 14, 1936. G. L. CHERRY ET AL Re. 19,820
APPARATUS FOR HANDLING TREATED ARTICLES
Original Filed May 10, 1929 2 Sheets-Sheet 1
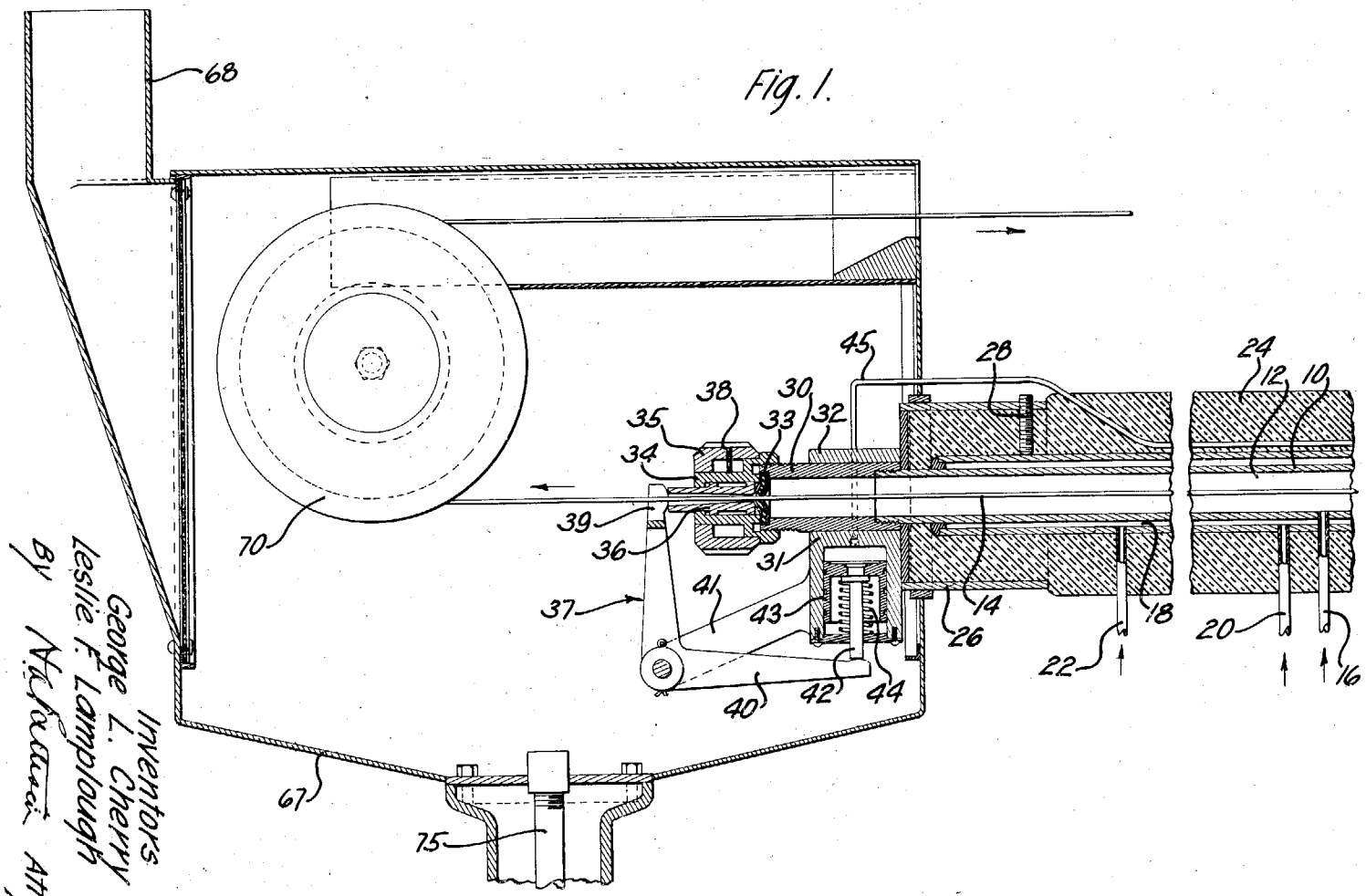
Inventors
George L. Cherry
Leslie F. Lamplough
By N. A. Pattison Atty.

APPARATUS FOR HANDLING TREATED ARTICLES
Original Filed May 10, 1929 2 Sheets-Sheet 2
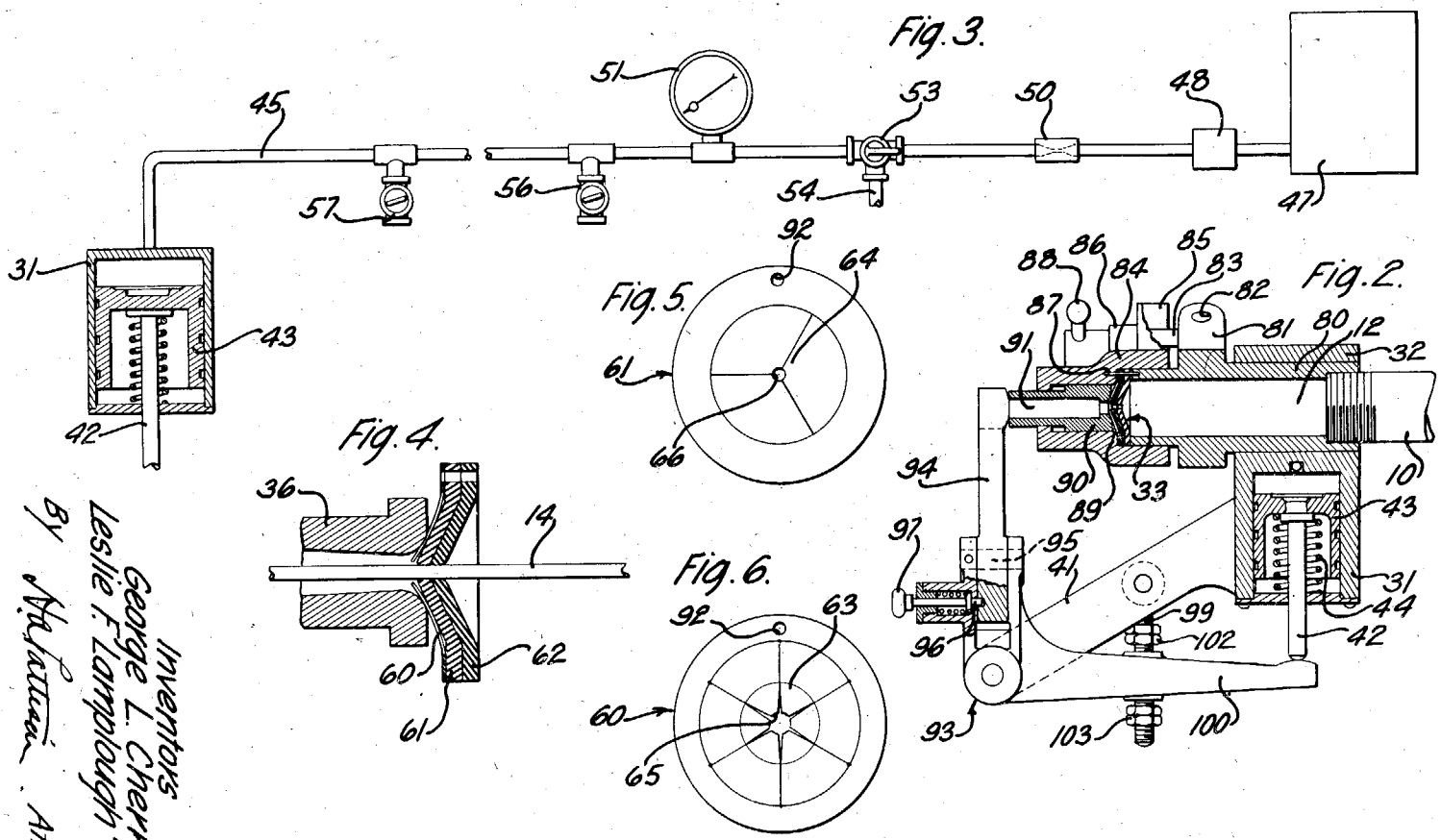
Inventors
George L. Cherry
Leslie F. Lamplough
By H. A. Patterson Att'y.

Reissued Jan. 14, 1936 Re. 19,820

UNITED STATES PATENT OFFICE 19,820

APPARATUS FOR HANDLING TREATED ARTICLES

George Lafayette Cherry, Western Springs, Ill., and Leslie Fawcett Lamplough, Baltimore, Md., assignors to Western Electric Company, Incorporated, New York, N. Y., a corporation of New York Original No. 1,885,080, dated October 25, 1932, Serial No. 362,108, May 10, 1929. Application for reissue September 17, 1934, Serial No. 744,432

7 Claims. (Cl. 18—6)

This invention relates to apparatus for handling treated articles, and more particularly to a pneumatic seal and control means therefor designed for use with strand treating apparatus.

In the continuous vulcanization of rubber covered wire, the wire, having a freshly applied covering of vulcanizable rubber compound thereon, is passed through a chamber containing steam at high pressure, which vulcanizes the covering. From the steam chamber the wire passes through suitable cooling and drying steps, after which it is ready to be wound upon take-up reels in the usual manner. In order to prevent leakage of steam at the point where the covered wire emerges from the steam chamber, it is necessary to provide a seal which shall permit the wire to pass therethrough and which at the same time shall be substantially steam-tight.

An object of this invention is to provide means for effectively sealing a chamber or other container for fluid under pressure while permitting the passage of an article therethrough, which is controlled in accordance with the operating conditions.

In the preferred form of the invention, a plurality of nested flexible disks are disposed at the outlet end of the steam chamber and are provided with apertures to permit passage of the strand therethrough, and a yielding member engages the outer disk to limit its outward movement, the yielding member being held in position by pneumatic pressure which is adjustably controlled by a suitable control system.

The invention will be more fully understood from the following description taken in connection with the appended drawings, in which Fig. 1 is a longitudinal sectional view of an apparatus embodying the invention, Fig. 2 is a longitudinal sectional view of a modified form of seal, Fig. 3 is a diagrammatic illustration of the means for controlling the pneumatic pressure exerted on the seal, Fig. 4 is an enlarged sectional view of the sealing disks in assembled relation, Fig. 5 is an elevational view of one of the sealing disks, and Fig. 6 is a similar view of another of the sealing disks.

Referring more particularly to the drawings in which like numerals designate the same members throughout the several views, the reference numeral 10 designates a cylindrical pipe which may be of considerable length and which forms a chamber 12 designed to permit the passage of a rubber covered wire 14 to be vulcanized therein. Steam under pressure is admitted to the chamber 12 through an inlet pipe 16 and is maintained in the chamber at a pressure corresponding to the temperature necessary to vulcanize the covering during its passage through the chamber. The pipe 10 is surrounded by a steam jacket 18 to which steam is admitted through an inlet 20, the steam and condensate thereof passing out of the jacket through an outlet 22 to a steam trap (not shown). The steam chamber and jacket are surrounded by a covering 24 of any suitable heat insulating material, a sleeve 26 being fitted over one end of this covering and held in fixed relation to the steam jacket 18 by means of a plurality of set screws 28, of which one is shown in Fig. 1.

A tubular member 30 (Fig. 1) is threaded to the end of pipe 10 and supports a cylinder 31 suspended therefrom by means of a collar 32. Member 30 is recessed at its outer end to permit sealing disks, indicated generally at 33, to seat therein. A clamping member 34 is threaded to member 30 and is shaped to clamp the outer edges of the disks in the recess of member 30 in such a manner as to cause them to act as gaskets to prevent the escape of steam from the chamber 12. A knurled member 35, of fiber or other suitable heat insulating composition, is mounted exteriorly of member 34 and is fixed thereto by means of a set screw 38, so as to permit member 34 to be rotated by hand for the purpose of adjusting it. The interior of member 34 is provided with a cylindrical bore in which a hollow retaining member 36 is slidably mounted, its inner end engaging sealing disk 60 to restrain the disks against outward movement due to the pressure of the steam in chamber 12 against their inner surfaces, the retaining member being so disposed as to engage the disk 60 intermediate of the aperture 65 and the periphery of the disk, as seen in Fig. 4.

The retaining member 36 is yieldingly urged against the disks by a bell crank lever 37 which is carried by a bracket 41 formed integral with the cylinder 31. Lever 37 has a bifurcated arm 39 which engages the outer end of member 36 at either side of the wire 14. The other arm 40 of the lever engages a piston rod 42 fixed to a piston 43 mounted in the cylinder 31, the piston being urged upwardly by means of a compression spring 44 which surrounds the rod 42, and being adapted to be moved downwardly by fluid pressure, as described below.

The cylinder 31 is supplied with pressure fluid such as compressed air through a duct 45 which, as shown in Fig. 1, extends along the steam jacket 18 in close proximity thereto over the greater part of the length of the steam jacket, the purpose of this arrangement being to keep the duct and the steam jacket at substantially the same temperature in order to minimize relative movement due to temperature changes. The pressure fluid, which may be compressed air, is supplied from a container 47 (Fig. 3), whence it passes through an adjustable pressure reducing valve 48 of any suitable construction, thence through a constricted aperture 50 in duct 45 to the cylinder 31. At the end of the apparatus which is adjacent to the container 47 is positioned a gauge 51 and a stop-and-waste cock or three-way valve 53 having an outlet 54 and adapted, when in the position shown in Fig. 3, to permit free passage of the air from the container 47 to the cylinder 31, but capable of being rotated in the clockwise direction as viewed in Fig. 3 to a position where the flow of air from container 47 is obstructed and the air in cylinder 31 is allowed to exhaust through outlet 54. Pet-cocks 56 and 57 are likewise provided at opposite ends of the apparatus for the purpose of temporarily controlling the pressure in cylinder 31 by permitting the escape of air.

The detailed construction of sealing disks 33 is shown in Figs. 4, 5 and 6, from which it will be seen that a disk 60, of spring metal, and two disks 61 and 62, of resilient material, such as rubber, are assembled in nested relation. The number of disks may, of course, be varied in accordance with the steam pressures employed, and other factors. Each of the disks is provided with radial slits forming a plurality of inwardly extending tongues 63—64, the radial slits being arranged so that no two of them are in registry with each other, this arrangement preventing escape of steam through the slits. The disks are provided wih central apertures 65—66 positioned to register with each other when the disks are assembled, the aperture 65 being of slightly larger diameter than the covered wire to be handled by the apparatus, while the apertures 66 are of slightly smaller diameter than the wire.

The entire seal just described is positioned within a casing 67 which serves to confine such steam and vapor as may escape through the seal, an exhaust stack 68 being provided to carry away the steam.

A pulley 70 is positioned within the casing 67 in such relation that the wire emerging from the steam chamber may pass thereover on its way to a take-up reel (not shown). A drain pipe 75 leads from the bottom of the casing 67 and is designed to carry off the condensate of the steam in the casing as well as any excess liquid from other sources.

In the operation of the apparatus thus far described, the covered wire is supplied to the steam chamber from a continuous extrusion machine or other apparatus of known construction, and is threaded through the steam chamber and seal, over pulley 70, and passed to the take-up reel (not shown). Steam at the desired pressure being furnished to the steam chamber 12 and jacket 18, and tension being applied to the wire, the wire moves through the steam chamber, where it is vulcanized, and thence through the sealing unit 33, which permits its passage without permitting the passage of any considerable amounts of steam therethrough. It being desirable to cause the disks 60 and 61 to bear against the moving wire as snugly as possible without marring the covering thereof or causing excessive friction, the operator adjusts the pressure in cylinder 31 to secure the desired pressure on member 36 by adjusting the pressure reducing valve 48. When the machine is being started or when a new length of wire is being threaded into the apparatus, the valve 53 is rotated ninety degrees in the clockwise direction as viewed in Fig. 3, thereby reducing the air pressure in cylinder 31, to atmospheric. When the vulcanized rubber covering begins to pass through the seal, the valve 53 is returned to the position shown in Fig. 3, whereupon the air pressure in cylinder 31 gradually builds up to that desired, a too rapid rise in the pressure being prevented by the action of aperture 50. The pressure of member 36 upon the seal may be completely released at any time by turning valve 53 as above described, or it may be temporarily reduced to any desired extent by partially or completely opening pet-cock 56 or 57 to bleed the necessary amount of air from the pressure line.

In the embodiment shown in Fig. 2, a tubular member 80 is threaded to the end of pipe 10 and has formed thereon oppositely disposed ears 81 supporting oppositely positioned pivot pins 82 carrying eye-bolts 83, of which one is shown in Fig. 2. A clamping member 84 is slidably mounted upon the outer end of member 80 and is provided with slotted lugs 85 adapted to receive the eye-bolts 83. Nuts 86 are threadedly mounted on the outer ends of the eye-bolts, each of the nuts being provided with a slidable cross bar 88 to facilitate the quick adjustment and release of the nuts. By this means, the clamping member 84 is arranged to be held in its operative position, wherein its shoulders 89 clamp the outer edges of the disks 60, 61 against the end of member 80 to prevent the escape of steam from the chamber 12. A pin 87 is seated in member 80 and projects through indexing holes 92 of the sealing disks to keep them in proper registry, the pin projecting into a corresponding recess in member 84. The interior of clamping member 84 is provided with a cylindrical bore in which a retaining member 90 is slidably mounted, its inner end engaging the sealing disk 60 to restrain the disks against outward movement due to the pressure of the steam in chamber 12 against their inner surfaces, the retaining member being so disposed as to engage the disk 60 between the aperture 65 and the periphery of the disk. The member 90 is provided with an axial passage 91 to permit the covered wire to pass therethrough, which passage may be forwardly flared as shown in Fig. 1, or cylindrically drilled as shown in Fig. 2.

The bell crank lever 93 shown in Fig. 2 is similar in structure and function to the bell crank lever 37 shown in Fig. 1 except that its arm 94 is articulated at 95 to enable it to be swung laterally out of engagement with member 90 to facilitate cleaning the passage 91. Arm 94 is normally held in operative position by a spring pressed detent 96 seated in a recess in the arm and adapted to be withdrawn therefrom by means of a button 97 fixed to the outer end of the detent.

An eye-bolt 99 is pivoted to bracket 41 and extends downwardly through an aperture in the lower arm 100 of lever 93. Lock nuts 102, 103 are adjustably fixed to the eye-bolt 99 above and below the arm 100 to limit its movement in either direction.

While the invention has been described with particular reference to an apparatus for vulcanizing rubber covered wire wherein steam is employed, it will be understood that it is capable of numerous other uses without departing from the spirit of the invention as defined in the appended claims.

What is claimed is:

1. In apparatus for handling strand material, a fluid seal adapted to permit the passage of a strand therethrough, means for adjustably controlling the seal comprising a conduit for pressure fluid, a restricted aperture in the conduit, and a stop-and-waste cock positioned in the conduit between the restricted aperture and the seal.

2. In apparatus for handling strand material, a pressure fluid container, a seal for the container adapted to permit the passage of a strand therethrough, and means for adjustably controlling the seal comprising a conduit for pressure fluid, adjustable pressure reducing means in the conduit, a restricted aperture in the conduit, and valve means selectively operable to permit and to prevent passage of pressure fluid from the pressure reducing means.

3. In combination, a fluid pressure container having an opening in the wall thereof and a fluid seal comprising a resilient member, means to secure said member in position to close said opening, said member being apertured to permit passage of a strand therethrough, a movable retaining member associated with the resilient member and being supported to move in one direction to exert pressure on said resilient member, fluid pressure means to move said retaining member in said direction and means for supplying fluid pressure independent of the fluid pressure in said container to said fluid pressure means.

4. In combination, a fluid pressure container having an opening in the wall thereof and a fluid seal comprising a resilient member, means to secure said member in position to close said opening, said member being apertured to permit passage of a strand therethrough, a movable retaining member associated with the resilient member and being supported to move in one direction to exert pressure on said resilient member, fluid pressure means to move said retaining member in said direction, means for supplying fluid pressure independent of the fluid pressure in said container to said fluid pressure means, and means positioned remote from said fluid pressure means manually operable for controlling the fluid pressure supplied to said fluid pressure means.

5. In combination, a fluid pressure container having an opening in the wall thereof and a fluid seal comprising a resilient member, means to secure said member in position to close said opening, said member being apertured to permit passage of a strand therethrough, a movable retaining member associated with the resilient member and being supported to move in one direction to exert pressure on said resilient member, a piston, means operably connecting the piston and retaining member to move said retaining member in said direction and means for supplying fluid pressure independent of the fluid pressure in said container to the piston.

6. In combination, a fluid pressure container having an opening in the wall thereof and a fluid seal comprising a resilient member, means to secure said member in position to close said opening, said member being apertured to permit passage of a strand therethrough, a movable retaining member associated with the resilient member and being supported to move in one direction to exert pressure on said resilient member, a piston, means operably connecting the piston and retaining member to move said retaining member in said direction, means for supplying fluid pressure independent of the fluid pressure in said container to said piston, and means positioned remote from the piston manually operable for controlling the fluid pressure supplied to the piston.

7. In an apparatus for treating vulcanizable material applied to a strand, a chamber for subjecting said material to a vulcanizing fluid under pressure, and a seal for said chamber comprising resilient means for engaging said material on a strand, a movable retaining member associated with said resilient means, and means operable by fluid pressure independently of the pressure of the vulcanizing fluid in said chamber for moving said retaining member against said resilient member.

GEORGE LAFAYETTE CHERRY.
LESLIE FAWCETT LAMPLOUGH.